US011272690B2

(12) United States Patent
Gelardi, II

(10) Patent No.: US 11,272,690 B2
(45) Date of Patent: Mar. 15, 2022

(54) TOY WITH MECHANICALLY LOCKED INNER CAPSULE

(71) Applicant: Anthony Gelardi, II, Biddeford, ME (US)

(72) Inventor: Anthony Gelardi, II, Biddeford, ME (US)

( * ) Notice: Subject to any disclaimer, the term of this patent is extended or adjusted under 35 U.S.C. 154(b) by 727 days.

(21) Appl. No.: 15/704,346

(22) Filed: Sep. 14, 2017

(65) Prior Publication Data
US 2018/0070560 A1 Mar. 15, 2018

Related U.S. Application Data

(60) Provisional application No. 62/394,993, filed on Sep. 15, 2016.

(51) Int. Cl.
*A01K 15/02* (2006.01)
*F16B 2/06* (2006.01)
*A63B 43/00* (2006.01)

(52) U.S. Cl.
CPC .......... *A01K 15/025* (2013.01); *A01K 15/021* (2013.01); *A63B 43/00* (2013.01); *F16B 2/06* (2013.01)

(58) Field of Classification Search
CPC .... A01K 15/02; A01K 15/026; A01K 15/025; A01K 15/021; A01K 29/00; A63H 3/28; A63H 3/31; A63H 5/00; A63H 33/40
See application file for complete search history.

(56) References Cited

U.S. PATENT DOCUMENTS

| | | | | |
|---|---|---|---|---|
| 1,595,441 A | * | 8/1926 | Zenger | A63B 43/00 473/571 |
| 3,075,317 A | * | 1/1963 | Craft | G10D 7/12 446/207 |
| 5,419,730 A | * | 5/1995 | Diresta | A63H 5/00 446/193 |
| 7,066,779 B2 | * | 6/2006 | Willinger | A63H 3/28 119/707 |
| 7,833,079 B2 | * | 11/2010 | Willinger | A63H 5/00 446/184 |
| 8,033,253 B2 | * | 10/2011 | Ritchey | A01K 15/025 119/707 |
| 8,186,309 B2 | * | 5/2012 | Specht | A01K 15/026 119/707 |
| 8,235,762 B2 | * | 8/2012 | Rutherford | A01K 15/025 446/184 |
| 8,468,977 B2 | * | 6/2013 | Markham | A01K 15/025 119/709 |
| 9,345,234 B2 | * | 5/2016 | Curry | A01K 15/025 |
| 9,635,837 B2 | * | 5/2017 | Simon | A01K 15/026 |
| 10,219,489 B2 | * | 3/2019 | Ma | A01K 15/025 |
| 10,362,765 B2 | * | 7/2019 | Vap | A01K 29/00 |
| 10,433,523 B2 | * | 10/2019 | Stone | A01K 15/025 |

(Continued)

Primary Examiner — Kathleen I Alker

(57) ABSTRACT

A hollow, compressible or rigid hollow body has mechanical retaining devices such as sound generators, scent capsules, LED lights and vibrating mechanisms and identifying or responding detection elements held, secured and locked therein without the use of any solvents, glues, sonic welding, spin welding or other bonding materials. The hollow contaminant-free bodies are particularly useful for animals and recreation. Some of the above contain carcinogens harmful to animals if ingested.

8 Claims, 9 Drawing Sheets

(56) References Cited

U.S. PATENT DOCUMENTS

2007/0245976 A1* 10/2007 Ritchey ............... A01K 15/026
119/709
2007/0287355 A1* 12/2007 Jager .................... A01K 15/025
446/202

* cited by examiner

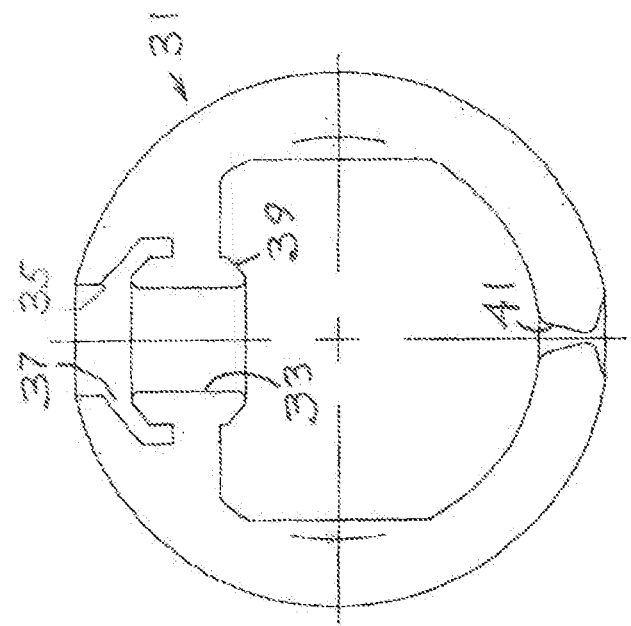
FIG. 7
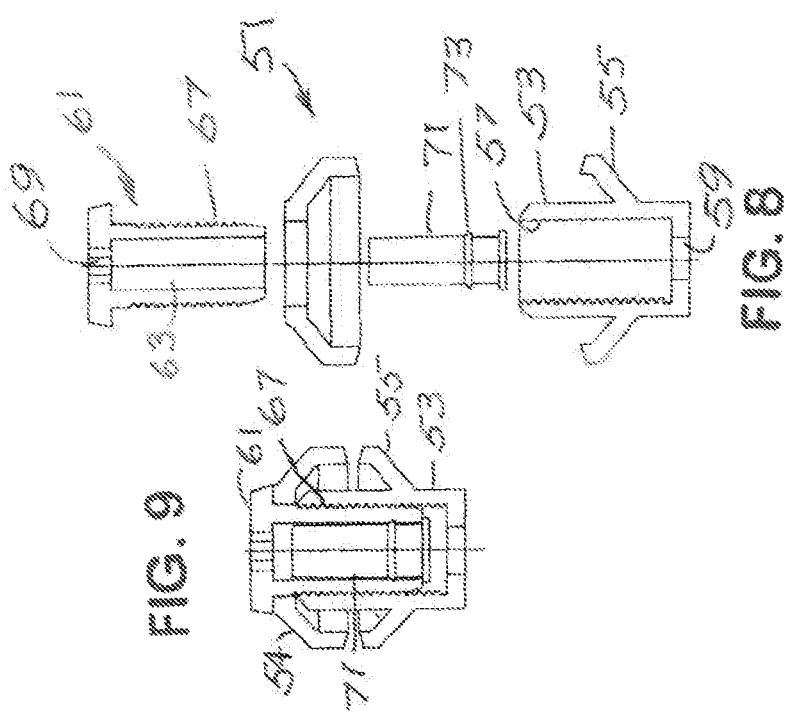
FIG. 8
FIG. 9

TOY WITH MECHANICALLY LOCKED INNER CAPSULE

This application claims the benefit of U.S. Provisional Application No. 62/394,993 filed Sep. 15, 2016, which is hereby incorporated by reference in its entirety as if fully set forth herein.

SUMMARY OF THE INVENTION

The invention is a hollow, compressible or rigid, animal toy with mechanical means of mounting internally retained devices such as sound generators, scent capsules, lights, and vibrating mechanisms and other devices without the use of any solvents, glues, sonic-welding, spin-welding, or other bonding materials that may contain carcinogens harmful to animals if ingested.

The invention has three ways of mechanically holding a pet entertaining device in a squeezable compressive or ridged ball or other shape. The device may generate sounds, emit light, scent or other desirable effects, or a microchip to assist in finding the shape. In one embodiment, an inverted integrally molded neck with a stiffening rib extends through an opening in the ball or shape. A device is inserted in the neck and secured therein with one or more locking belts, bands or rings and is pushed with the neck into the ball.

In another embodiment a ball is molded to capture a three-part plug which holds a device. A device is pushed into the inner part. An inner part with internal grippers is pushed through a molded hole into the ball. A collared outer part with external grippers is pushed through the molded opening into the inner part. The collar and wings on the inner part fix the holder and device within the ball. In a third embodiment a snap-in body holds a device and a vented pinch cap secures the holder.

A hollow, compressible or rigid hollow body has mechanical means of retaining devices such as capsules containing sound generators, scent releasers, LED lights, batteries and vibrating mechanisms and identifying, recording and responding elements. The capsules are held, secured and mechanically locked in the hollow bodies without the use of any solvents, glues, sonic welding, spin welding or other bonding materials. The hollow contaminant-free bodies are particularly useful for animals that carry the hollow bodies. Some of the above contain carcinogens harmful to animals if ingested.

The invention provides a toy having a hollow body. An entertainment device within the hollow body is mechanically attached to and locked within the hollow body subsequent to the manufacture of the toy in the absence of and without bonding material, glue, solvents, paint, epoxy, adhesive, ultrasound, ultra violet or radio frequency welding. The entertainment device provides sound, vibrations, light or scent. The toy is a hollow animal toy. The hollow body has a hole and an invertible tube connected to the ball in continuation of an inside of the hole. The tube is extended outward for receiving the entertainment device. A clamp mechanically locks the entertainment device in the outwardly extended tube. The entertainment device clamped in the tube is pushed into the ball, reversing the tube and locking the entertainment device in the ball.

At least one stiffening rib is formed along the tube.

More than one locking ring may hold the entertainment device in the invertible tube within the hollow ball.

In one example, the hollow body has a wall with an opening and the opening has a sloping and axially extending recess in the wall and an inward projection of the wall around the hole. A mechanical lock for locking an entertainment device in the hole has a capsule receiver adapted for pushing through the hole and engaging the projection around the hole and a capsule holder for holding the entertainment device, a collar adapted for fitting in the recess. The capsule receiver and the capsule holder have connectors for connecting and securing the receiver and the holder. The connectors are complementary threads. The entertainment device is pressed within and retained in the capsule holder.

In one form, the hollow body is a hollow ball having relatively thick opposite walls spaced from each other by relatively thin walls. A relatively large hole in one of the thin walls of the body admits into the body the entertainment device and an attachment of the entertainment device and the body. A relatively small weep hole is in the thin wall opposite the large hole. The thin walls provide flexibility.

In another example, the hollow body has a hole with a narrow outer opening and a wide inner opening. Two inner parallel bars are formed in the body and extend across an inner part of the wide inner opening. A mechanical lock has a central tube for tightly holding the entertainment device. Two outward and downward extending legs fit over the two inner parallel bars and snap on the legs for snapping inside the hollow body and holding the lock in the wide inner opening. The central tube in the lock has inward projections at a radially outward end of the tube. A pinch cap has a top fitting in the narrow outer opening in completion of an outer surface of the hollow body. Extensions extend radially inward from the top and into the tube. Barbs extending outward from the extensions snap outward under the projections in the tube, thereby connecting the pinch cap with the lock. The entertainment device is in a capsule having a radially inner end abutting a radially inner end of the tube. Outer walls of the capsule fit within inner walls of the tube. The capsule outer walls have at least one projection engaging inner walls of the tube of the lock.

The invention mechanically locks an entertainment device within a hollow body in the absence of bonding material, glue, solvents, paint, epoxy, adhesive, ultrasound, ultra violet or radio frequency welding, which have unwanted side effects for mouth-carried objects.

The entertainment device is in a capsule. Locking the capsule within the mechanical lock and pushing the mechanical lock with the capsule through a hole into the hollow body retains the lock with the capsule in the hollow body.

A mechanical lock has an integral tube molded with the hollow body. A clamping belt locks the device in the tube within the hollow body.

The clamping involves extending the integral tube outward from the hollow body, inserting the capsule in the tube, clamping the capsule in the tube with a belt and pushing the capsule, the tube and the belt inside the hollow body.

Another mechanical lock example provides a cup-shaped recess in a hole in a hollow body.

A receiver with an internal connector has an outer extension for engaging a protrusion within the hollow body around the hole.

The receiver is pushed through the hole.

A cup-shaped cap fits in the cup-shaped recess.

A capsule is placed in a holder having an external connector.

The capsule is locked in the receiver and the holder joins the internal connector and the outer connector.

In another example, an enlarged opening is provided in an inner part of the hole through a wall of the body.

Bars are molded across the enlarged opening.

A snap-in lock body has a central tube, inward projections in a top of the tube, legs connected to and spaced from the tube, and snaps on the legs, Pressing the capsule into the tube and then pressing the snap-in body and legs into the hole and against the bars and moves the snaps into place within the hollow body.

A pinch cap has a cover and central extensions and snaps extend outward from the extensions.

Pressing the pinch cap into the tube, compresses the snaps that expand under the projections in the top of the tube, thereby closing the hole in the hollow body.

These and further and other objects and features of the invention are apparent in the disclosure, which includes the above and ongoing written specification, with the claims and the drawings.

BRIEF DESCRIPTION OF THE DRAWINGS

FIG. 7 shows an alternate molded ball for mechanical insertion and locking of a noisemaker or other reactive devices.

FIG. 8 is an exploded cross-sectional view of the holding and locking components for mechanically securing the plug in the ball.

FIG. 9 is a compressed and cross-sectional view of the holding and locking components for mechanically securing the plug in the ball.

DETAILED DESCRIPTION

Figure 1:
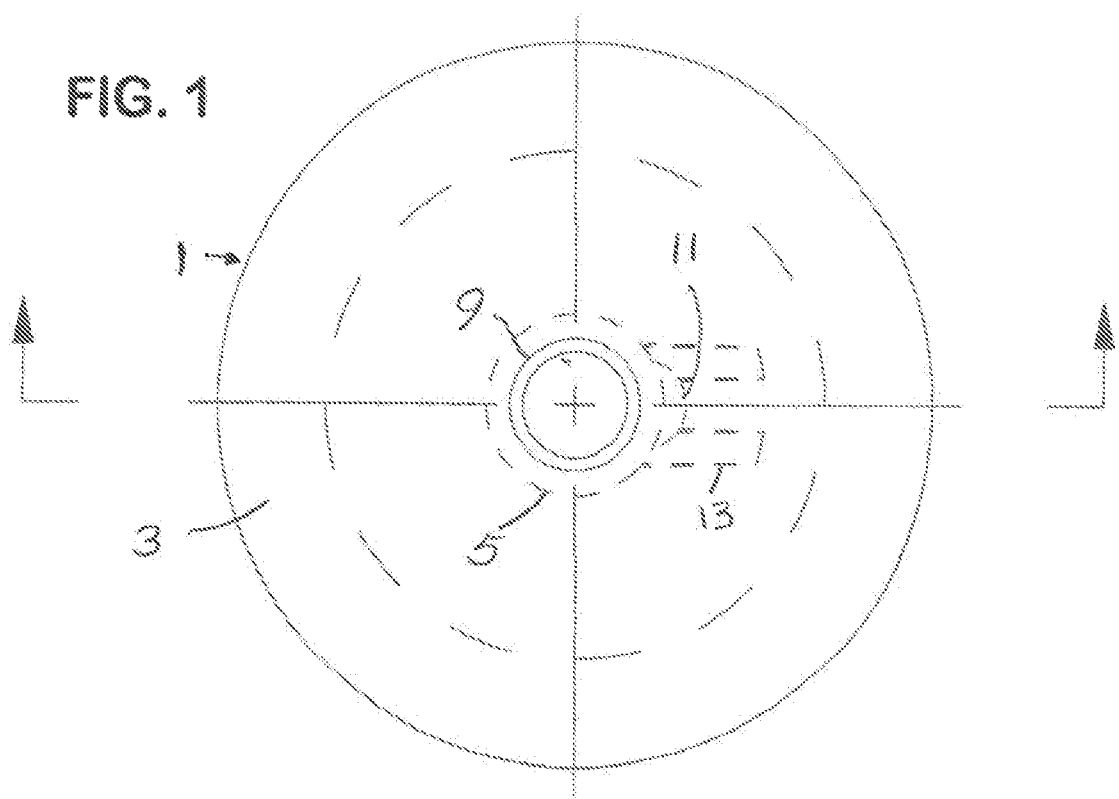
FIG. 1 is a top view of a ball.

FIG. 1 is a top view of a ball. In one form a hollow ball is molded from a food grade plastic material. The flexible and resilient ball 1 has a substantial thickness 3, about ½ inch thick, for example. A relatively thin integrally molded tubular neck 5, perhaps about ⅛ inch thick and ¾ inch in diameter, extends into the ball. The tube-shaped neck 5 has an internal opening 7, about ½ inch in diameter for example, that extends into the ball. A lip 9 is molded inwardly at the outer end of the opening 7. Top lip 9 allows a larger mandrel to pass through yet gives the appearance of a smaller hole.

A directional stiffening rib 11 extends along the tubular neck 5. A stiffener rib 13 extends from the top of neck 5 and rib 11 to the inner surface of ball 1.

Figure 2:
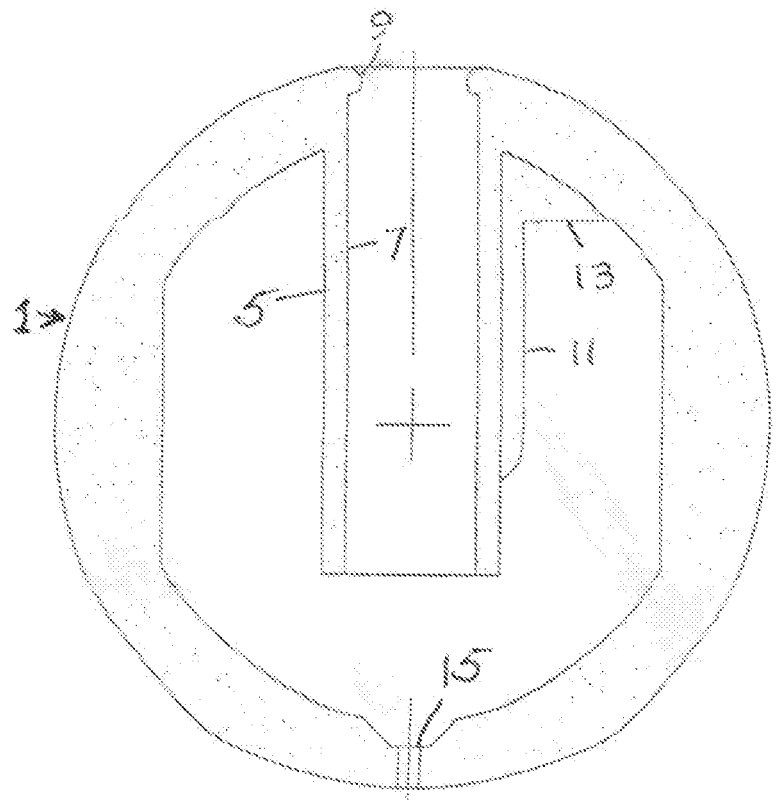
FIG. 2 is a cross-sectional side view of the ball shown in FIG. 1.

FIG. 2 is a cross-sectional side view of the ball shown in FIG. 1. As shown in FIG. 2, the hollow ball 1 has an integrally formed internal tube-like neck 5 that extends into the ball 1. An opening 7 extends through the hollow ball 5 and the tube-like neck 5. A directional stiffening rib 11 is integrally formed on a radially outward surface 6 of the tube-like neck 5, and a stiffener 13 extends from the top of neck 5 along an inner surface 2 of the ball 1. A lip 9 extends inward into the opening 7 from an outer part of the ball to provide a smaller hole in the ball at the outer end of the opening 7. A weep hole 15 is formed in the ball opposite the opening 7 through the tube-like neck 5.

Figure 3:
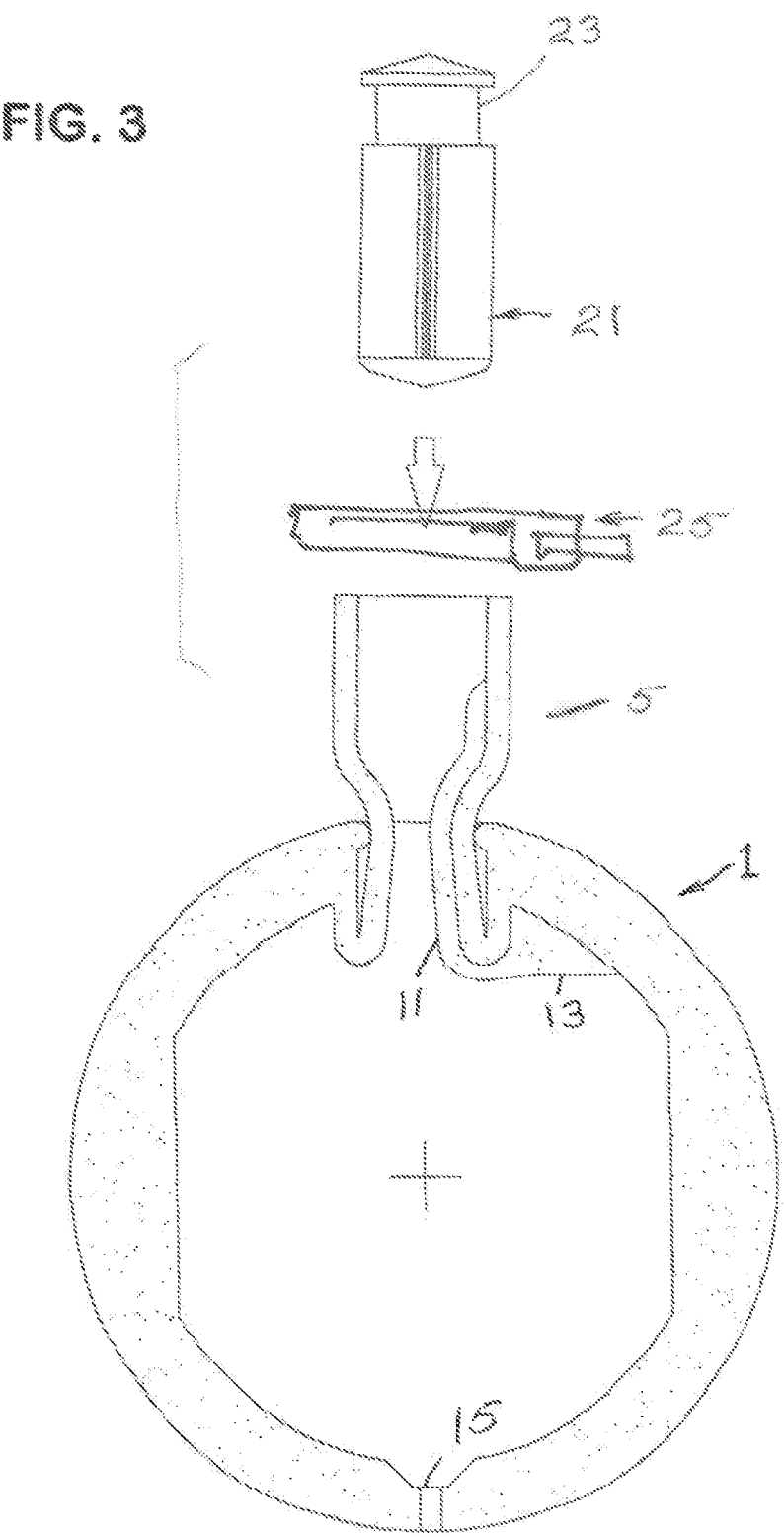
FIG. 3 is a cross-sectional side view of the ball with its neck inverted and extended from the ball. A capsule and locking belt are ready to be placed in and on the extended neck.

FIG. 3 is a cross-sectional side view of the ball with its neck inverted and extended from the ball. A capsule and locking belt are ready to be placed in and on the extended neck. The tube-like neck 5 is pulled outward from the ball 1 using a mandrel and turning the tube-like neck 5 inside out, forming an inverted neck 5 extending from the ball 1. A protective capsule 21 with an internal noise-making or entertainment device such as a squeaker is pushed into the inverted neck 5. The capsule 21 has a locking recess 23 near at least one end. A locking belt 25 is placed around the inverted neck 5 opposite the recess 23 on the capsule 21.

Figure 4:
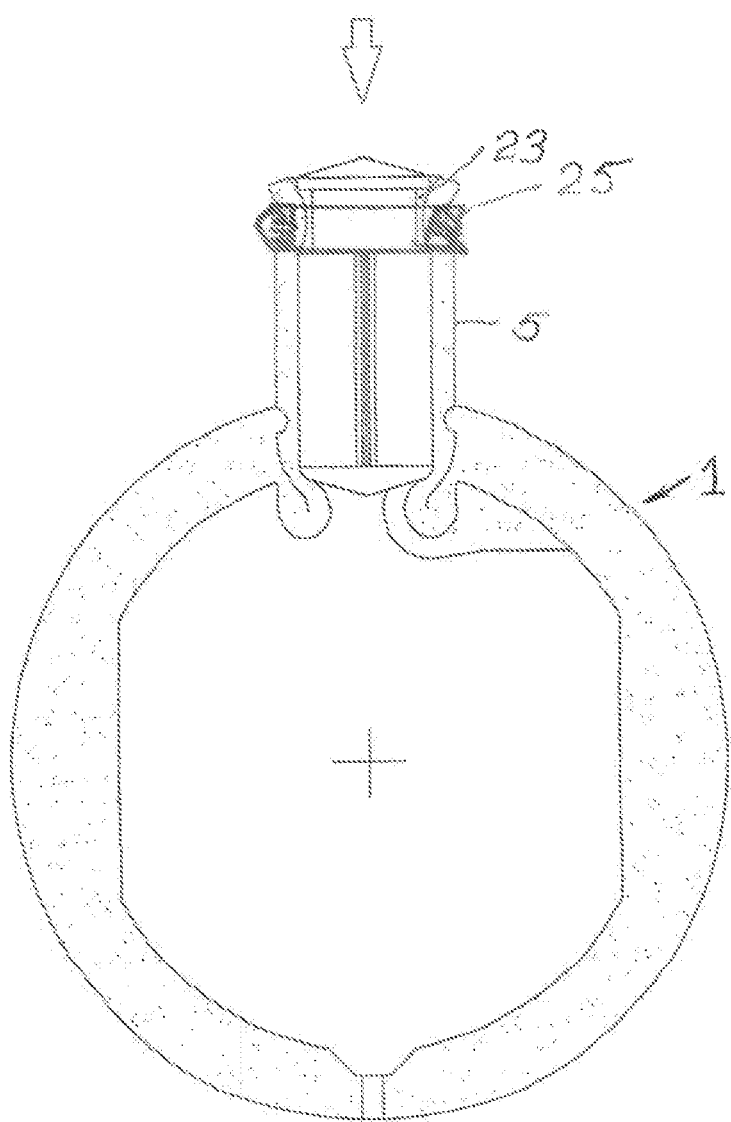
FIG. 4 is a partial cross-sectional view of the ball and the capsule inserted and locked on the extended neck with the locking belt or ring.

FIG. 4 is a partial cross-sectional view of the ball and the capsule inserted and locked on the extended neck with the locking belt or ring. The belt 25 compresses an area of the neck 5 into the recess 23. The belt 25 is locked in place.

Figure 5:
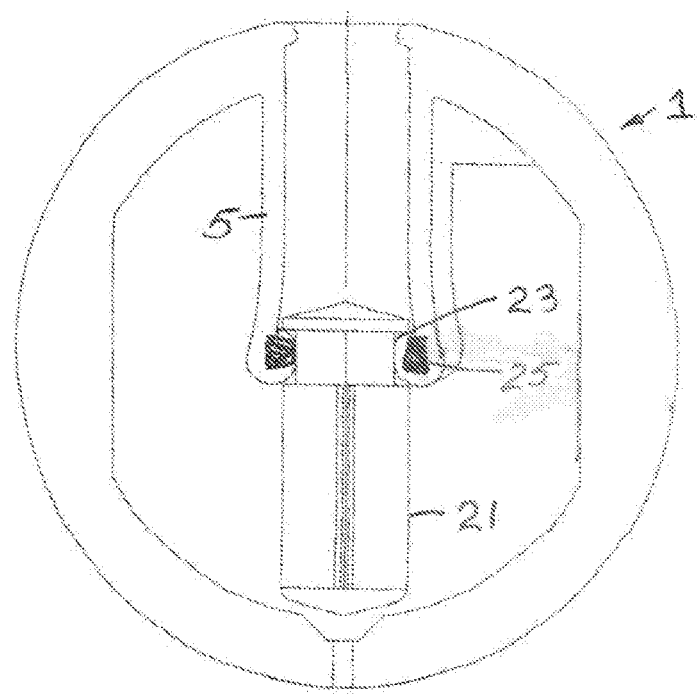
FIG. 5 shows the capsule and neck pushed back into the ball with the locking ring held between two layers of the neck.

FIG. 5 shows the capsule and neck pushed back into the ball, with the locking ring held between two layers of the neck. The capsule 21 and neck 5 are pressed into the ball 1, reversing the neck 5 into its inward position in the ball. The entire neck 5 is turned back to its original condition, with the exception of the end part of neck 5 that is compressed in the capsule recess 23 by the locking belt 25. The ball is ready for use as a squeakable entertainment and training ball.

Figure 6:
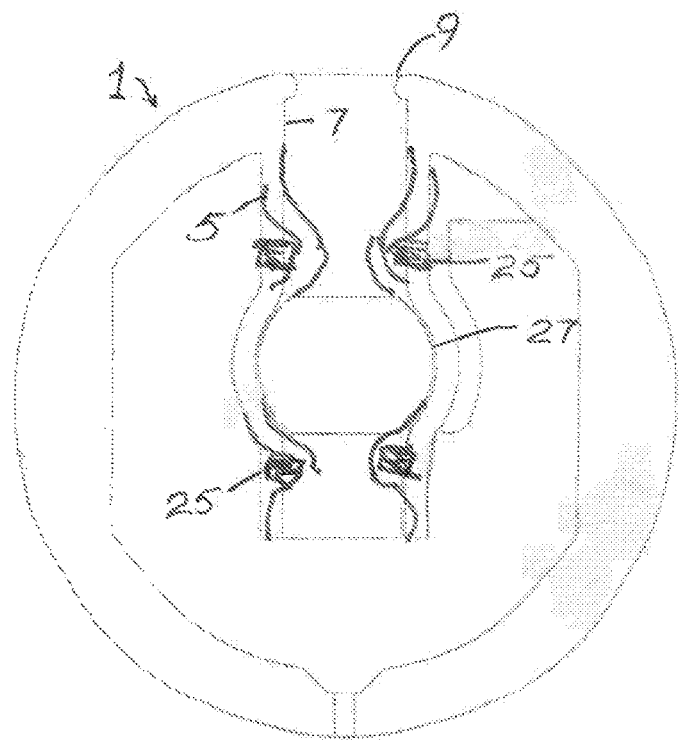
FIG. 6 shows an alternative structure with other components held in the neck by locking rings.

FIG. 6 shows an alternative structure with other components held in the neck by locking rings. As shown in FIG. 6, the neck 5 may be used to hold another device 27 that is pushed past the lip 9 and partially through the axial opening 7 in the neck 5. Other devices may be by the neck 5 or may be locked in the neck with one or more locking belts or rings 25.

FIG. 7 shows an alternate molded ball for mechanical insertion and locking of a noisemaker or other reactive plug. A ball 31 is molded in a configuration for holding a mechanical locking device shown in FIG. 8. Ball 31 has an opening 33. An outer portion 35 of opening 33 has a sloping and axially extending recess 37 for securing a collar of the mechanical lock. An inner wall 38 of ball 31 near the inner end of the opening 33 is sloped and axially formed to anchor an inner part of the mechanical lock. A weep hole 41 is formed in the molded ball 31 across from the opening 33.

FIG. 8 is an exploded cross-sectional view of the holding and locking components for mechanically securing the plug in the ball. A mechanical lock 51 is constructed to secure an electronic or noisemaking capsule 71 in the ball 31. Lock 51 has an inner capsule receiver 53 which is pushed through opening 33 into the center of the ball 31. A cup-shaped stop 55 on the outer surface of receiver 53 cooperates with the shaped projection 39 on the inner wall of the ball to prevent the receiver from being withdrawn from the ball 31. A female threaded central opening 57 holds the capsule 71 and its locking holder 61. A hole 59 is formed in an end of the receiver.

The capsule 71 is pressed within holder 61. One or more grippers 73 are formed on an outer wall of the capsule 71 to secure the capsule in the inside 63 of the holder 61. The holder 61 has a male threaded outer surface 67 to cooperate with the female threaded inner surface 57 of the receiver 53. Holder 61 holds a collar 54 in recess 37 of ball 31. A hole 69 allows air to pass through the capsule 71.

FIG. 9 is a compressed and cross-sectional view of the holding and locking components for mechanically securing the plug in the ball.

Figure 10:
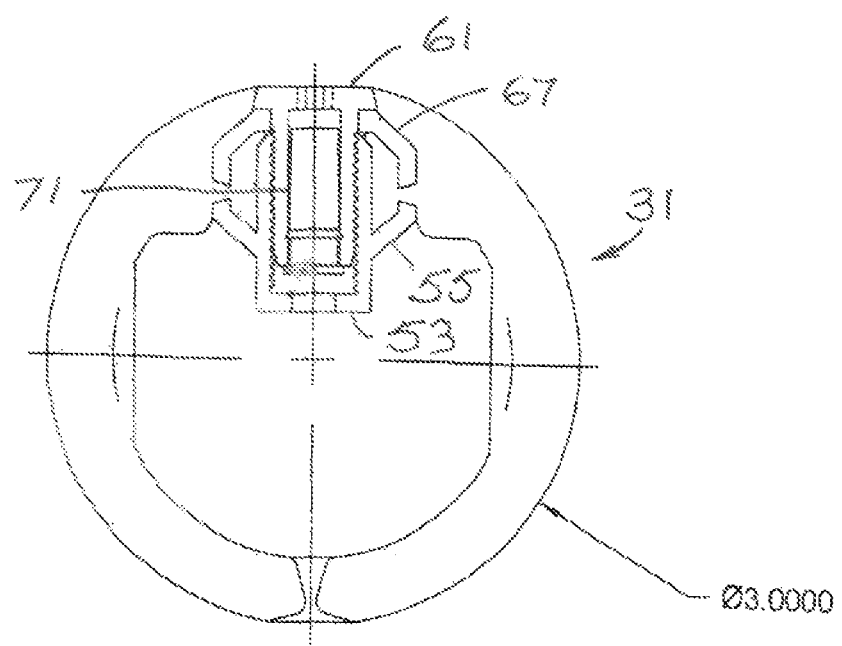
FIG. 10 is a cross-sectional view showing the locking components holding the plug or capsule in a ball.

FIG. 10 is a cross-sectional view showing the locking components holding the plug or capsule in a ball. Ball 31 and all of the elements of the mechanical lock 51 are shown assembled with the capsule 71 mechanically locked within the ball 31.

Figure 11:
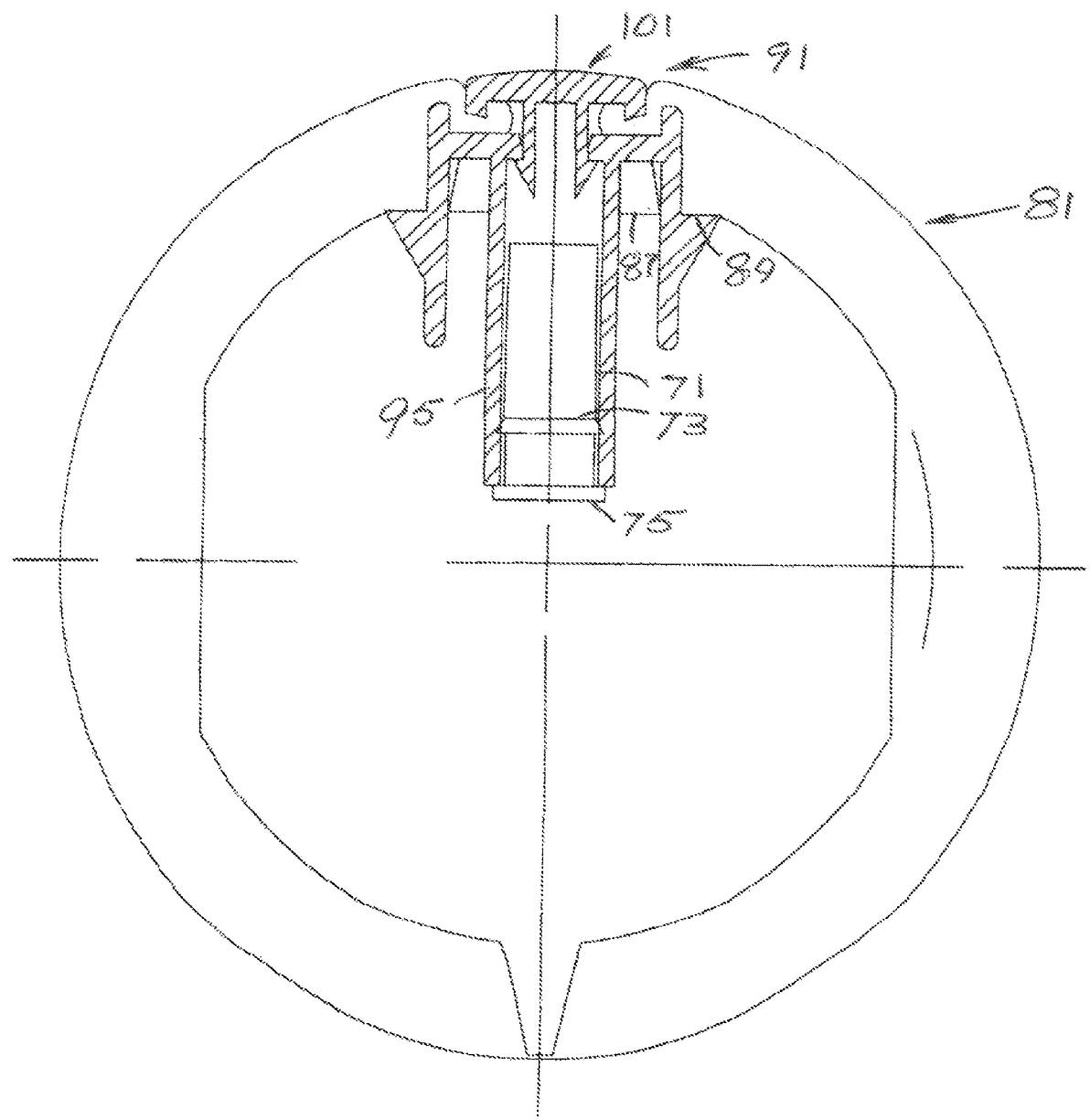
FIG. 11 is a cross-sectional view showing a capsule or plug mechanically locked in a ball.

FIG. 11 is a cross-sectional view showing a capsule or plug mechanically held by lock 91 in a ball 81.

Figure 12:
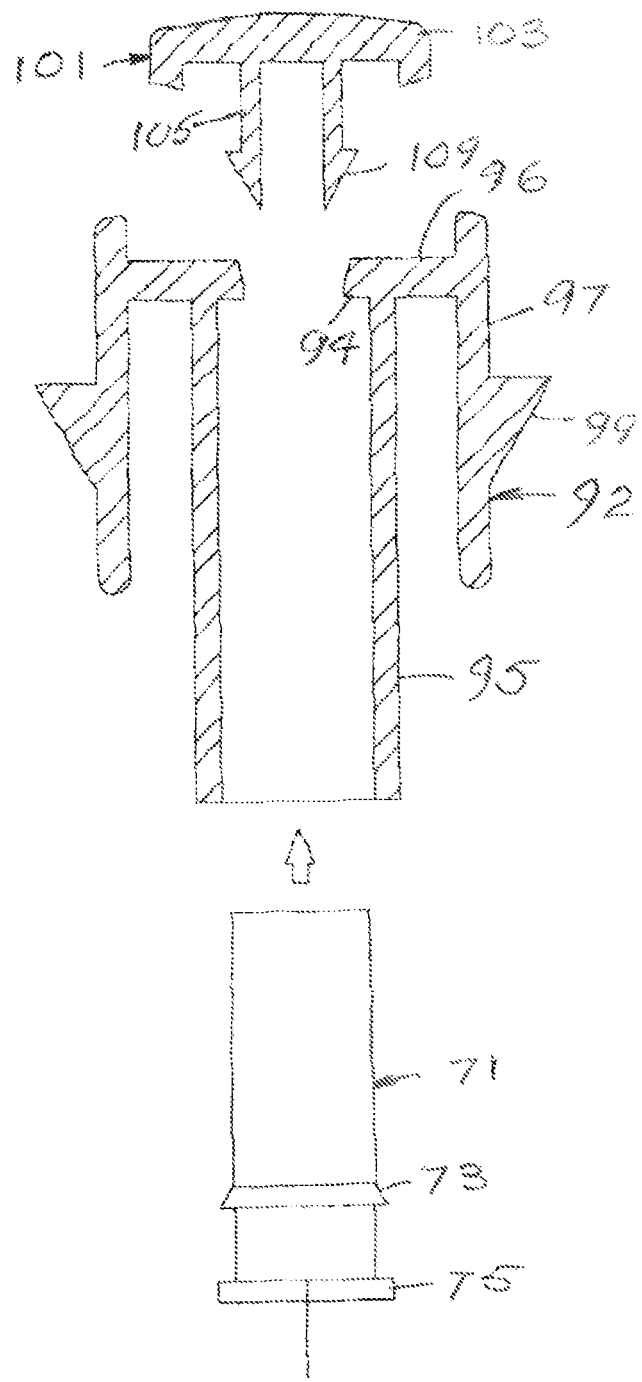
FIG. 12 is an exploded view of the mechanical lock and plug shown in FIG. 11.

FIG. 12 is an exploded view of the mechanical lock 91 and capsule shown in FIG. 11.

Figure 13:
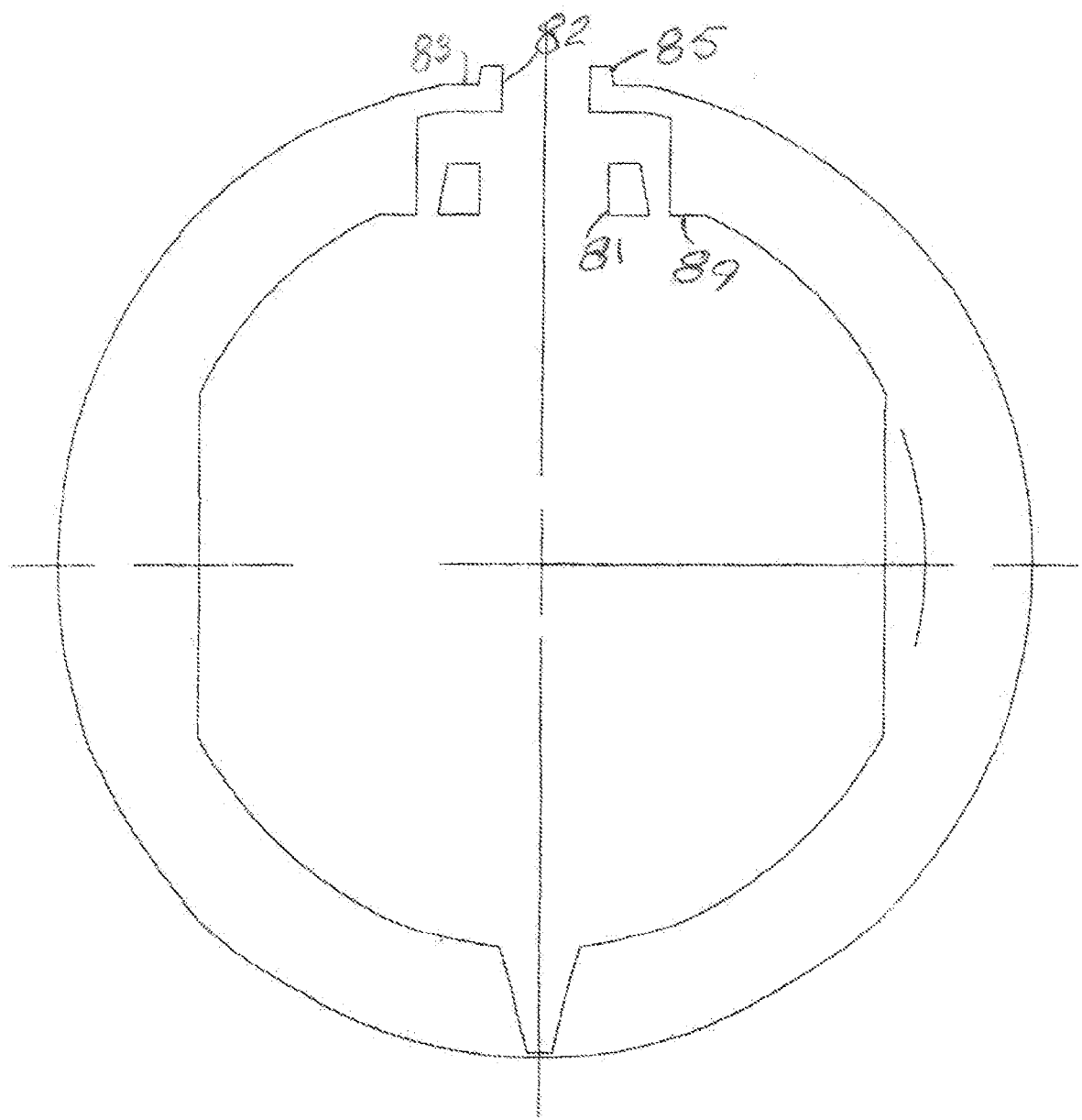
FIG. 13 is a cross-sectional view showing a molded ball for holding the mechanical lock and plug shown in FIGS. 11 and 12.

FIG. 13 is a cross-sectional view showing the molded ball 81 for holding the mechanical lock 91 and capsule shown in FIGS. 11 and 12. Ball 81 has a mechanical lock 91 securing a capsule 71 within the lock and the ball. Ball 81 is molded as shown in FIG. 13 with a hole 82, a flattened top 83 with two projections 85 and two parallel inner bars 81 having trapezoidal cross-sections.

The mechanical lock 91 as shown in FIG. 12 has a snap-in body 92 with a central tube 95 and a laterally extending top 96. Top 96 has downward legs 97 which fit over the trapezoidal inner bars 87 within the molded ball 81. The downward legs have laterally outwardly extending barbs 99 that spring outward to lock under the flat inner surface 89 of the ball 81, as shown in FIG. 11.

Before inserting the snap-in body 92 in the ball 81, the capsule 71 is pressed within the tube 95 until the outer end 75 of the capsule abuts the end of tube 95. Grippers 73 on the capsule bite into the inner wall of the tube 95, holding the capsule in the tube. After the snap-in body 92 is snapped into hole 82 and anchored in ball 81 vented pinch cap 101, as shown in FIGS. 11 and 12, is snapped into the top of body 92. The vented pinch cap 101 has a top 103 with downward extensions 105 which engage the projections 85 and pinch the extensions inward against the top 96 of the snap-in body 93. When the extensions spring outward, triangular barbs 109 engage the lock in the inside of the hollow body.

A central portion 107 of cap 101 has triangular barbs 109 which anchor the vented pinch cap 101 to inward extensions 94 of the top 96 of the snap-in body 93.

While the invention has been described with reference to specific embodiments, modifications and variations of the invention may be constructed without departing from the scope of the invention, which is defined in the following claims.

I claim:

1. An apparatus comprising:
a toy having a hollow body, a hole and an invertible tube located inside of the hollow body and connected to the hollow body in continuation of an inside of the hole, an entertainment device within the hollow body of the toy, and
at least one locking ring within the hollow body of the toy and locking the entertainment device on the tube between two layers of the tube,
wherein the entertainment device is inserted, mechanically attached to and mechanically locked within the tube by the at least one locking ring on an outer side of the tube while the tube is extended outward from the hollow body of the toy,
wherein the tube with the entertainment device mechanically locked therein is pushed into the body such that the at least one locking ring locks the tube and the entertainment device on an opposite side of the tube from the entertainment device in the absence of bonding material, glue, solvents, paint, epoxy, adhesive, ultrasound, ultra violet or radio frequency welding.

2. The apparatus of claim 1, wherein the entertainment device provides sound, vibrations, light or scent.

3. The apparatus of claim 1, wherein the toy is a hollow animal toy.

4. The apparatus of claim 1, wherein the tube is extended outward from the hollow body for receiving the entertainment device and wherein the at least one locking ring further comprises a mechanical clamp mechanically clamping the entertainment device in the outwardly extended inverted tube, wherein the entertainment device is clamped in the inverted tube and the tube with the entertainment device clamped therein is pushed through the hole into the hollow body with the clamping device on an opposite side of the tube from the entertainment device, reversing the tube and locking the entertainment device in the hollow body.

5. The apparatus of claim 4, further comprising at least one stiffening rib formed along an outside of the tube when the tube is inside the hollow body.

6. The apparatus of claim 4, wherein the at least one locking ring holding the entertainment device in the invertible tube is outside of the tube when a remainder of the tube is extended outside of the hollow body and the at least one locking ring is inside the tube when the tube is reversed inside the tube within the hollow body.

7. The apparatus of claim 4, wherein the hollow body is a hollow ball having thick walls and the tube has relatively thin walls compared to the thick walls of the hollow ball wherein the hole is a large hole in one of the thick walls of the ball for admitting into the ball the tube with the entertainment device and the mechanical clamp clamping the entertainment device in the tube, and the ball having a relatively small hole in the thick wall opposite the large hole.

8. The apparatus of claim 1, wherein a part of the entertainment device extends beyond the tube within the hollow body of the toy.

* * * * *